United States Patent
Cho

(10) Patent No.: US 7,406,325 B2
(45) Date of Patent: Jul. 29, 2008

(54) METHOD OF ALLOCATING LINKS IN A 1X EVDO SYSTEM

(75) Inventor: Kye Chol Cho, Icheon-si (KR)

(73) Assignee: UTStarcom Korea Limited, Seoul (KR)

( * ) Notice: Subject to any disclaimer, the term of this patent is extended or adjusted under 35 U.S.C. 154(b) by 78 days.

(21) Appl. No.: 10/560,297

(22) PCT Filed: Jul. 26, 2004
(Under 37 CFR 1.47)

(86) PCT No.: PCT/KR2004/001880

§ 371 (c)(1),
(2), (4) Date: Nov. 7, 2006

(87) PCT Pub. No.: WO2005/011154

PCT Pub. Date: Feb. 3, 2005

(65) Prior Publication Data

US 2007/0197244 A1     Aug. 23, 2007

(30) Foreign Application Priority Data

Jul. 25, 2003   (KR) .................. 10-2003-0051466

(51) Int. Cl.
*H04B 7/00* (2006.01)
(52) U.S. Cl. .................. 455/509; 455/450; 455/561; 455/451; 455/452.1

(58) Field of Classification Search .............. 455/509, 455/450, 451, 452.1, 456.2, 422.1, 404, 424, 455/455, 456, 464, 453, 67.11, 561
See application file for complete search history.

(56) References Cited

U.S. PATENT DOCUMENTS

| | | | |
|---|---|---|---|
| 5,812,948 A * | 9/1998 | Hjern et al. ............... | 455/435.1 |
| 6,584,315 B1 * | 6/2003 | Kang et al. ............... | 455/442 |
| 2001/0034223 A1 * | 10/2001 | Rieser et al. .............. | 455/404 |
| 2004/0032847 A1 * | 2/2004 | Cain ......................... | 370/338 |
| 2004/0048609 A1 * | 3/2004 | Kosaka ..................... | 455/422.1 |

* cited by examiner

*Primary Examiner*—Tan Trinh

(57) ABSTRACT

The present invention is directed to a method of allocating links in a base station of a 1xEVDO (EVolution Data Only) system. Conventionally, since a 1xEVDO system sequentially allocates a link to a user who requested a call setup irrespective of the link status, some of the allocated links may suffer from overload that eventually decreases the data transmission rate for the user. However, in order to perform the link allocation in due consideration of the link status, the present invention uses a link database including various status information, such as an equipment confirmation flag, a block flag, a current status, the total call user number, and the current call user number. With the status information, a base station control processor (BCP) in the 1xEVDO system of the present invention distributes traffic loads among the links and ensures an optimized data transmission rate.

3 Claims, 3 Drawing Sheets

[Fig. 1]
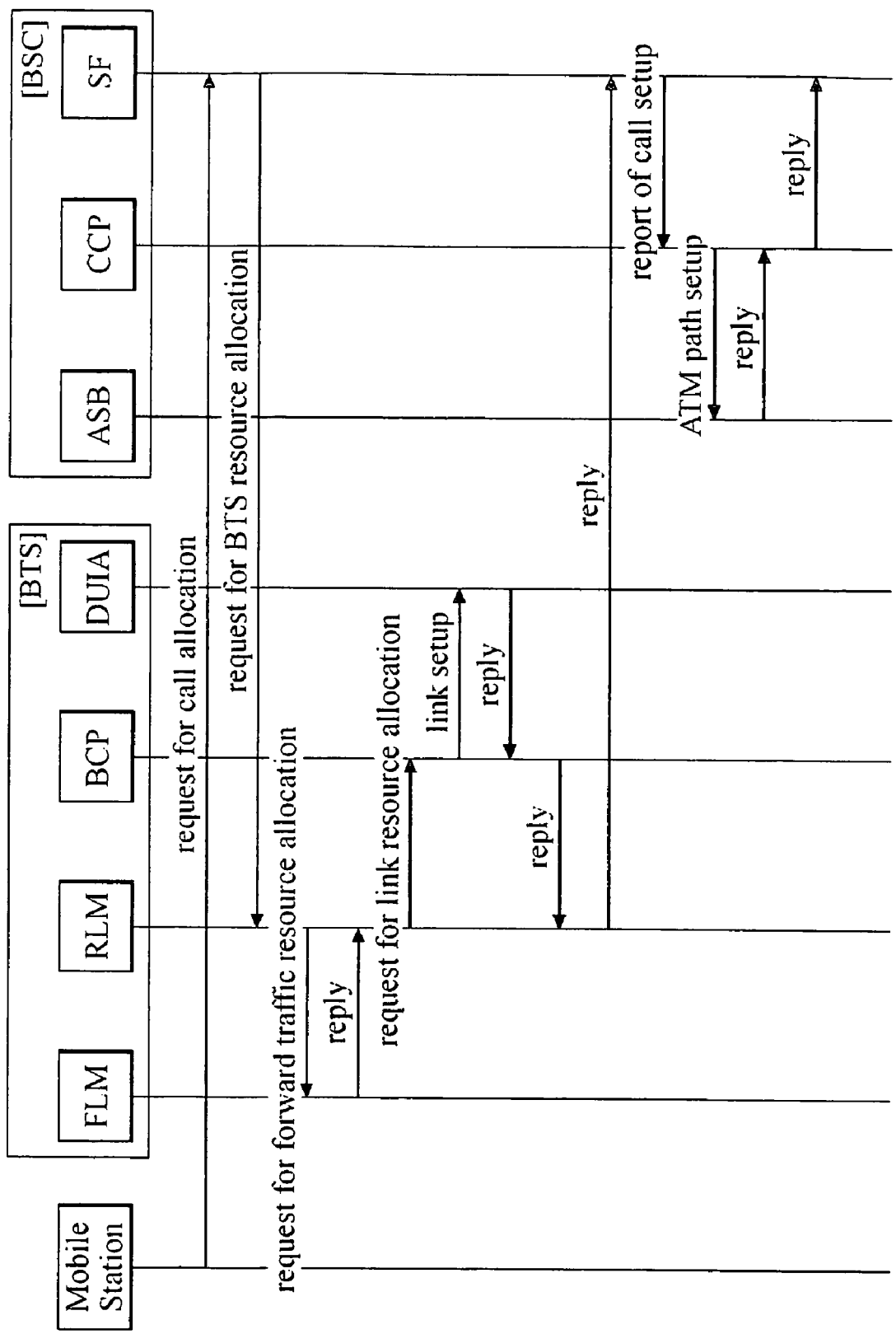

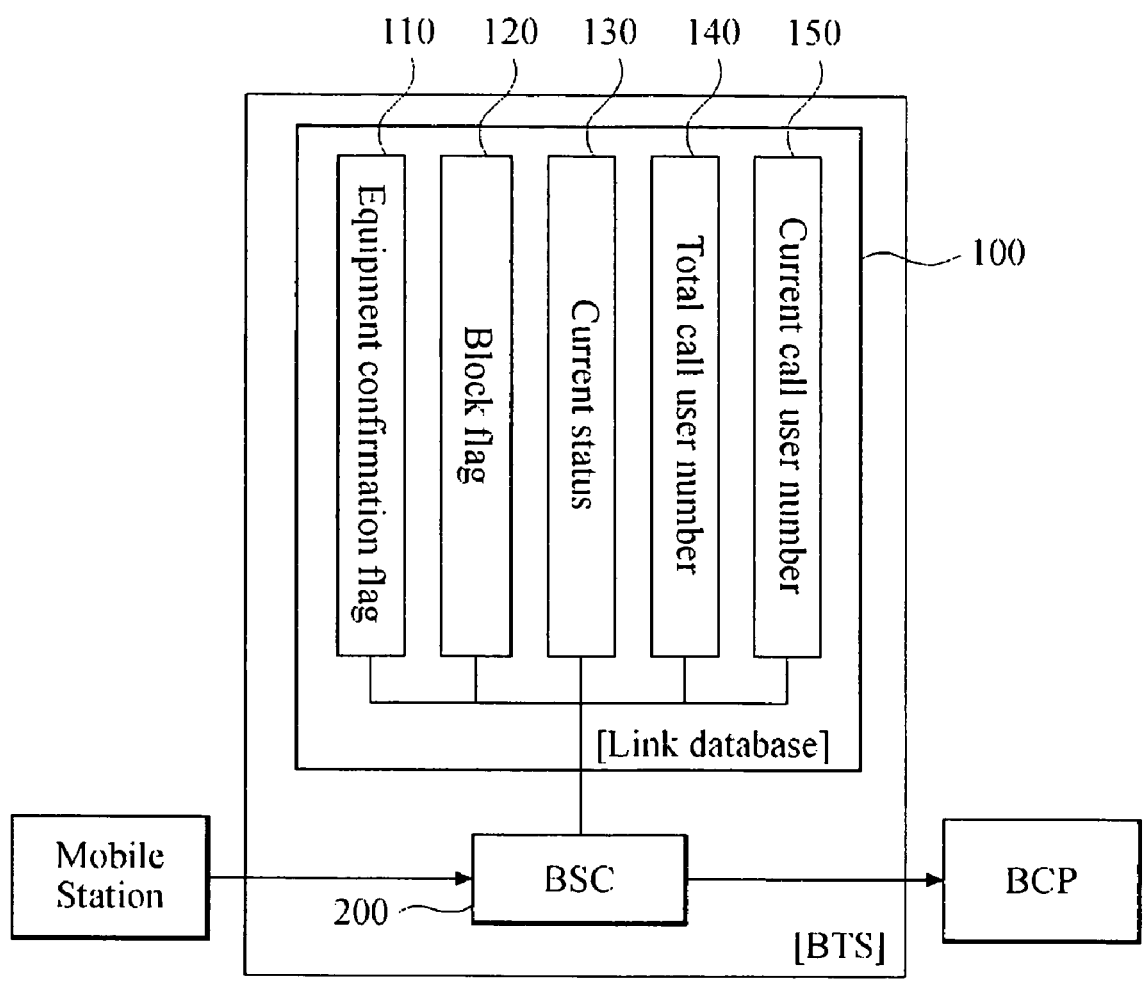
[Fig. 2]

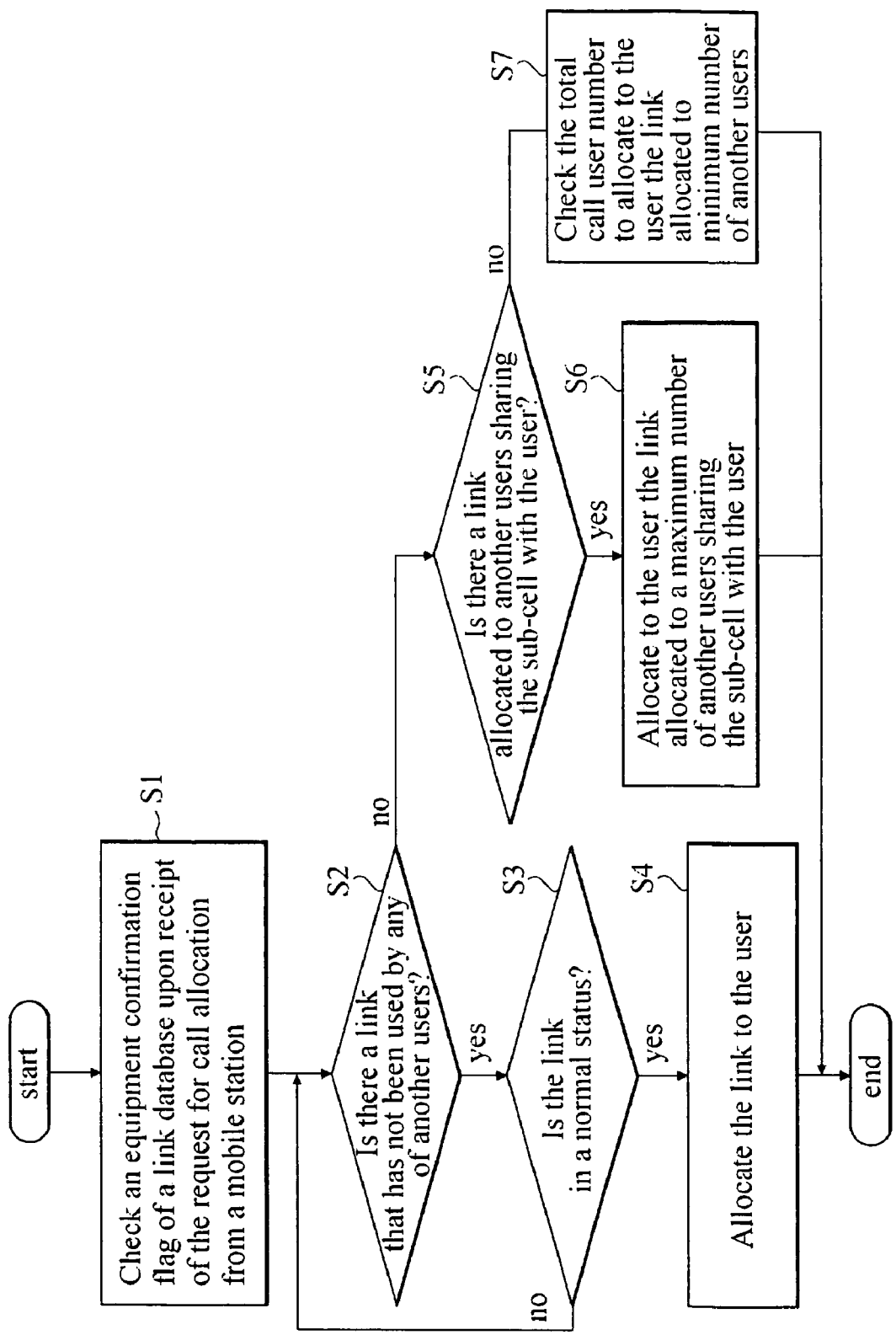
[Fig. 3]

METHOD OF ALLOCATING LINKS IN A 1X EVDO SYSTEM

TECHNICAL FIELD

The present invention generally relates to a method of allocating links in a 1×EVolution Data Only (EVDO) system, and more particularly to a method of optimizing the performance of the 1×EVDO system and the usage data rate of a user thereof to allocate links according to the link status.

BACKGROUND ART

Generally, the 1×EVDO is the dedicated protocol for transmitting packet data that are very different from the conventional IS-2000 wireless protocol. The maximum transmission rate of the 1×EVDO is 2.4576 Mbps in its forward direction. The link for communication between the base station transceiver subsystem (BTS) and the base station controller (BSC) is E1 or T1. Among these, the effective bandwidth of E1 is 2.048 Mbps (equivalent to 32 channels), which is comprised of 30 data channels of 1.92 Mbps, a framing channel, and a signaling channel (or a reserved channel). Further, the effective bandwidth of T1 is 1.544 Mbps (24 channels+1 bit), which is comprised of 24 channels of 1.536 Mbps and 1 signaling of 1 bit. A user of the 1×EVDO can be sequentially connected to only one wire link.

However, since a 1×EVDO system sequentially allocates a link to a user who requested a call setup irrespective of the link status, some of the allocated links may suffer from overload that eventually decreases the data transmission rate for the user.

DISCLOSURE OF INVENTION

Technical Problem

It is, therefore, the object of the present invention to address and resolve the above disadvantage associated with the conventional allocation method.

The object of the present invention is to optimize the data transmission rate for the users of the 1×EVDO having different wire/wireless link availabilities.

Technical Solution

In order to achieve the above objects, the allocation method in the 1×EVDO system according to the present invention provides a method of allocating links in a base station of a 1×EVDO system. Such system comprises a link database, wherein the link database includes an equipment confirmation item for representing equipment information of the link, a link status item for representing a status of the link, a total call user number item for representing the total number of users to whom the link is allocated, and a current call user number item for representing in each sub-cell the number of users to whom the link is allocated. The method comprises the steps of:

checking the equipment confirmation item upon request for a call allocation from a user;

checking the total call user number item to determine whether there remains a link that has not been used by any of other users;

if it is determined that there remains an unused link, checking the link status item to determine whether the link is in a normal status; and if it is determined that the link is in a normal status, allocating the link to the user.

According to another aspect of the present invention, the allocation method further comprises the steps of:

if it is determined that there remains no link that has not been used by any of the other users, checking the current call user number item to determine whether there remains a link allocated to the other users sharing the sub-cell with the user; and if it is determined that there remains a link allocated to the other users sharing the sub-cell with the user, allocating to the user the link allocated to a maximum number of the other users sharing the sub-cell with the user.

According to another aspect of the present invention, the allocation method further comprises the step of:

if it is determined that there remains no link allocated to the other users sharing the sub-cell with the user, checking the total call user number item to allocate to the user the link allocated to a minimum number of the other users.

Advantageous Effects

According to the features of the present invention, the wireless link availability of the 1×EVDO system can be enhanced, and thus more balanced usage of the link can be enabled by the sub-cell based allocation method. Therefore, the 1×EVDO user can enjoy an optimized data transmission rate.

BRIEF DESCRIPTION OF THE DRAWINGS

These drawings depict only the preferred embodiments of the present invention and should not be considered as limitations of its scope. These as well as other features of the present invention will become more apparent upon reference to the drawings in which:

FIG. 1 illustrates the signal flow upon the call setup in a 1×EVDO system according to a preferred embodiment of the present invention.

FIG. 2 illustrates a functional block diagram of the 1×EVDO system for implementing the allocation method according to a preferred embodiment of the present invention.

FIG. 3 illustrates a flow chart of the allocation method according to a preferred embodiment of the present invention.

BEST MODE FOR CARRYING OUT THE INVENTION

Hereinafter, preferred embodiments according to the present invention will be described and illustrated with reference to the accompanying drawings.

FIG. 1 shows the signal flow through a mobile station, a base station, and a BSC. FIG. 2 shows a functional block diagram of the 1×EVDO system for implementing the allocation method according to a preferred embodiment of the present invention. The 1×EVDO system of the present invention comprises (1) a link database 100 including equipment confirmation flag 110 for representing link equipment information, (2) block flag 120 for representing whether or not to operate the link, (3) a current status 130 for representing a status of the link, (4) total call user number 140 for representing the total number of users to whom the link is allocated, (5) current call user number 150 for representing in each sub-cell the number of users to whom the link is allocated, and (6) BTS control processor (BCP) 200 in the base station for allocating links upon request of a call setup.

With reference to FIG. 3, a method for allocation of links in a 1×EVDO system is described by the following.

First, BCP 200 of the BTS checks equipment confirmation flag 110 of link database 100 upon receipt of the request for call allocation from a mobile station (i.e., a user) (S1). Then, BCP 200 checks total call user number 140 of link database to determine whether there remains a link that has not been used by any of other users (S2). If it is determined in S2 that there remains an unused link, BCP 200 checks current status 130 of link database 100 to determine whether the link is in a normal status (S3). If it is determined in S3 that the link is not in a normal status, BCP 200 returns to S2. Otherwise, BCP 200 allocates the link to the user (S4).

Further, if it is determined in S2 that there remains no link that has not been used by any of the other users, BCP 200 checks current call user number 150 to determine whether there remains a link allocated to the other users sharing the sub-cell with the user (S5). If it is determined in S5 that there remains a link allocated to the other users sharing the sub-cell with the user, BCP 200 allocates to the user the link allocated to a maximum number of the other users sharing the sub-cell with the user (S6).

Further, if it is determined in S5 that there remains no link allocated to the other users sharing the sub-cell with the user, BCP 200 checks total call user number 140 to allocate to the user the link allocated to a minimum number of the other users (S7).

INDUSTRIAL APPLICABILITY

The wireless link availability of the 1×EVDO system can be enhanced, and thus more balanced usage of the link can be enabled by the sub-cell based allocation method. Therefore, the 1×EVDO user can enjoy an optimized data transmission rate.

Additional modifications and improvements of the present invention for link allocation in the 1×EVDO system may also be apparent to those of ordinary skill in the art. Thus, the particular descriptions herein is intended to represent only certain embodiments of the present invention, and is not intended to serve as limitations of an alternative allocation method within the spirit and scope of the invention.

The invention claimed is:

1. A method of allocating links in a base station of a 1×EVDO system comprising a link database, wherein the link database includes an equipment confirmation item for representing equipment information of the link, a link status item for representing a status of the link, a total call user number item for representing the total number of users to whom the link is allocated, and a current call user number item for representing in each sub-cell the number of users to whom the link is allocated, said method comprising the steps of:
   checking the equipment confirmation item upon request for a call allocation from a user;
   checking the total call user number item to determine whether there remains a link that has not been used by any of other users;
   if it is determined that there remains an unused link, checking the link status item to determine whether the link is in a normal status; and
   if it is determined that the link is in a normal status, allocating the link to the user.

2. The method as claimed in claim 1, said method further comprising the steps of:
   if it is determined that there remains no link that has not been used by any of the other users, checking the current call user number item to determine whether there remains a link allocated to the other users sharing the sub-cell with the user; and
   if it is determined that there remains a link allocated to the other users sharing the sub-cell with the user, allocating to the user the link allocated to a maximum number of the other users sharing the sub-cell with the user.

3. The method as claimed in claim 2, said method further comprising the step of:
   if it is determined that there remains no link allocated to the other users sharing the sub-cell with the user, checking the total call user number item to allocate to the user the link allocated to a minimum number of the other users.

* * * * *